United States Patent [19]

Grootegoed

[11] Patent Number: 5,108,230

[45] Date of Patent: Apr. 28, 1992

[54] SMALL BOAT DOCK AND APPARATUS FOR INSTALLING

[76] Inventor: Robert G. Grootegoed, 12284 Fowlers Mill Rd., Chardon, Ohio 44024

[21] Appl. No.: 594,049

[22] Filed: Oct. 9, 1990

[51] Int. Cl.⁵ .................................................. E02B 3/20
[52] U.S. Cl. ..................................... 405/218; 405/219; 405/209; 405/224; 114/263
[58] Field of Search ............... 405/195, 196, 203, 209, 405/218-221, 224; 114/230, 242, 249, 250, 253, 254, 263; 403/49, 85, 399; 441/137.7, 142.7, 142.8; 248/354.3; 182/179; 52/638

[56] References Cited

U.S. PATENT DOCUMENTS

| | | | |
|---|---|---|---|
| Re. 248,837 | 6/1960 | Usab | 405/219 X |
| 3,345,825 | 10/1967 | Parker | 405/218 |
| 3,397,546 | 8/1968 | Eisert et al. | 405/220 |
| 3,401,804 | 9/1968 | Link | 414/142.8 X |
| 3,614,871 | 10/1971 | Nordell | 405/221 |
| 3,999,397 | 12/1976 | Albery | 405/218 |
| 4,037,420 | 7/1977 | Wicks | 405/218 |
| 4,271,970 | 6/1981 | Miller et al. | 414/142.8 X |
| 4,349,297 | 9/1982 | Misener | 405/221 |
| 4,493,283 | 1/1985 | Elliott | 114/263 |

FOREIGN PATENT DOCUMENTS 1085554 7/1960 Fed. Rep. of Germany ...... 405/218

Primary Examiner—Dennis L. Taylor
Assistant Examiner—John A. Ricci
Attorney, Agent, or Firm—Donald A. Bergquist

[57] ABSTRACT

A boom for the installing of a small boat dock while the installer need not enter the water is presented along with the method for use. Diagonal supports necessary to the final installation in the best mode of the method invention are included.

14 Claims, 2 Drawing Sheets

SMALL BOAT DOCK AND APPARATUS FOR INSTALLING

INTRODUCTION

The present invention relates to docks for small boats and the installing thereof in operable position in the water without the need for the installer to enter the water. The equipment and method may be applied to existing docks, whether they be homemade or factory built. The installing process may be reversed to remove the dock from the operable position. Docks for small boats are used primarily at the edge of a body of water, such as a lake or a stream, and extend out into the water. Using this invention, the dock platform can be adjusted at any time during the year to accommodate changes in water level.

In the northern climes, small boat docks are generally installed in early spring and removed in late fall; the temperature of the water is relatively low in both seasons, making it quite undesirable and potentially dangerous to work in the water, as is required for installing most removable small boat docks. In some locales, leaving small boat docks in the water during winter months is proscribed by law.

PRIOR ART

There is presently known dock construction that allows a dock to be put into the water and removed from the water without getting into the water. Generally, such construction (as shown in U.S. Pat. No. 3,397,546, issued to Eisert et al., for instance) includes considerable and expensive metal framing for supporting each wood dock section, which framing is used to install the dock in connection with a float in the form of an airtight drum, and which framing is also the wood dock section support and therefore must remain with each dock section in the water. With the metal framing cost for each wood dock section in addition to the cost of the dock section itself, the cost per lineal foot of the installed dock is relatively high. In contrast, it will be seen that the present invention has no expensive metal framing necessary and yet provides an extremely stable dock surface.

In U.S. Pat. No. 3,614,871, Nordell has provided a large float to be placed under each new dock section at the edge of the body of water to freely float each new dock section to the distal end of the previously-installed sections where the new dock section is raised to a proper level by an elevating device and clamped onto place. This procedure requires a float or an assembly of floats, the total buoyancy being sufficient to support the largest dock section to be installed and also at least one person. The floats are placed under the dock section. To retrieve the float for re-use, the dock section must be raised to an elevation above the water level sufficient for the float to be removed. It is obvious that a rather specialized, relatively flat float or assembly of floats is required to practice this installation method, lest the freely floating new dock section capsize. In contrast, it will be seen that the present invention may use a float of any shape, and can even use a small boat for a float.

In U.S. Pat. No. 4,037,420, Wicks overcomes many of the disadvantages seen in the prior art by providing a float removably mounted under the distal end of a new dock element, thereby to floatably support that distal end above the water while the proximal end is lifted by the dock installer to a proximal anchoring point that is either on the shore or on a previously-installed dock section. With the proximal end anchored, the installer walks upon the float-supported new dock section to install vertical posts to anchor the distal end and to raise it to remove the float. Depending upon the desired elevation of the finished dock above the water level, the removal of the float from beneath the dock may be difficult. In contrast, it will be seen that in the present invention the float is never placed beneath any dock element; therefore removing the float is never a problem. In addition, the present invention allows that the float may be a small boat.

SUMMARY OF THE INVENTION

Thus, it is an object of the present invention to provide a small boat dock and a method for installing said dock so that it may be installed by a single installer without the installer entering the water.

Thus, it is an object of the present invention to provide an installing method adaptable to an existing small boat dock whereby said existing dock may be installed by a single installer without the installer entering the water.

It is an object of the present invention to provide a small boat dock having diagonal support braces interconnecting the vertical support posts thereof, which braces may be installed without the installer entering the water.

It is an object of the present invention to provide apparatus to install a small boat dock by supporting each new dock section by means of a float that remains somewhat remote from the dock section, which float may even be a small boat.

It is an object of the present invention to provide such a small boat dock having vertical supports engaging the earth at the bottom of the body of water in which the dock is installed and also having diagonal cross members interconnecting pairs of said vertical supports, thereby to stabilize the structure of the dock, which diagonal members may be installed without the installer entering the water although part of said members are submerged in the water.

DETAILED DESCRIPTION OF THE INVENTION

This invention will best be understood by referring to the accompanying figures, in which for each part identified therein the same reference number is used to identify that part throughout.

Figure 1:
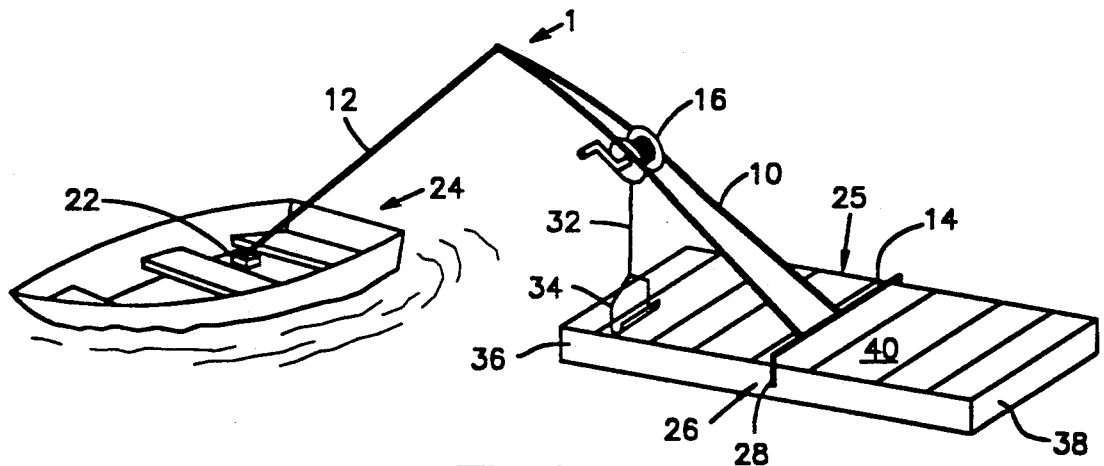
FIG. 1 shows, in perspective view, the boom apparatus of the present invention.

FIG. 1 is a perspective view of a boom 1 designed to be used in the installing method of this invention. The boom 1 comprises an elongated portion 10 that we will call a reach portion or simply the reach, a descending leg portion 12 attached to the distal end of the reach, and a stabilizing portion 14 attached to the proximal end of the reach and substantially normal thereto. The reach 10 and the descending leg 12 are not colinear; their axes therefore intersect and thereby define a plane that substantially includes both of these elements. Together, the reach 10 and the descending leg 12 form an archlike structure; these two elements could be combined in a single curved shape (still substantially within a single plane) without deterring from the function of the boom.

In a medial location on the reach portion 10, the boom includes a lifting winch 16, a cable winch being used in the preferred mode. The reach portion 10 may be a single piece, or, as in the preferred mode, it may be two substantially parallel pieces spaced apart for the installation therebetween of the lifting winch 16. The three portions of the boom 1 are fixedly joined in the configuration shown, but may be made to be disassembled for storage.

The distal end 22 of the descending leg 12 is adapted to attach to a float or a float assembly 24. No special float configuration or shape is required. It is especially noted that the float may be a small boat, as would likely be available to an installer installing a dock for small boats. It would be most suitable that the descending leg be adapted to attach to a central portion the bottom of said small boat, rather than to a transom, a bow, or a gunwale.

The stabilizing portion 14 may be a simple straight element to rest upon the flat surface of a dock section or the shore. In the best mode, said stabilizing portion includes means 26 to retain it on the dock section 25, thereby to prevent displacement of said stabilizing portion in a direction axial thereto. The retaining means 26 shown is a simple downward bend 28 in the stabilizing element, but other means may be obvious to even the most casual observer. It is not necessary that any clamping means be used, but such is not here proscribed.

Attached to the cable 32 of the lifting winch 16 is an attachment means 34, such as a hook or a grab, adapted to engage a distal edge 36 of the frame of the dock element 25 for the purpose of lifting said dock element at said edge.

Figure 2:
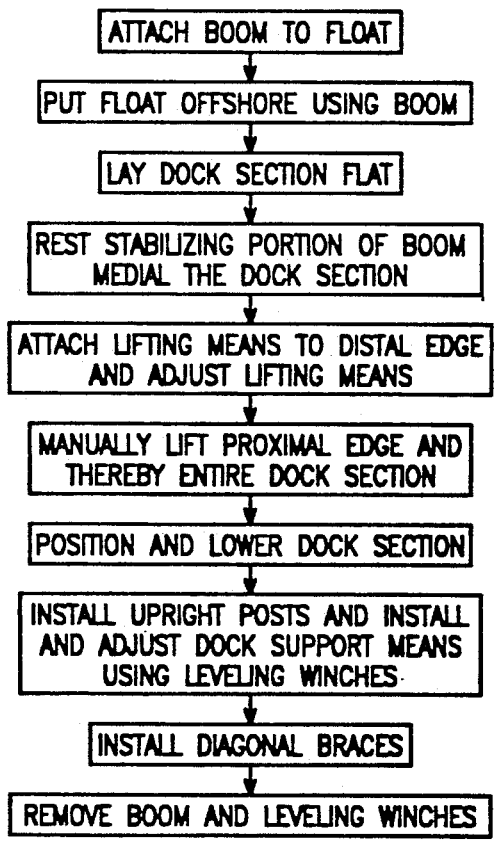
FIG. 2 is a block diagram of the method of the present invention employing the boom apparatus of the invention.

The method by which this apparatus is used is substantially as described in the following paragraphs and outlined in FIG. 2. Some variation of the method may be obvious as may suit a particular situation. For example, step 3 may preceed step 1. The description discusses the installing of the first dock section. A brief description will then follow to indicate changes required for installing additional new dock sections.

A new dock section 25 to be positioned is placed flat on the shore adjacent the waterline. This dock section has a distal edge 36 nearest the ultimate installed position thereof and it has a proximal edge opposite said distal edge 36. The boom 1, attached to a float 24, is positioned to rest with its stabilizing portion 14 upon the dock section 25 medial said dock section; this step will require the moving of the float 24 in the water to a position opposite the distal end of the new dock section, which moving is accomplished by the installer while standing on the shore. The winch hook 34 is engaged with the distal edge 36 of the dock section 25 and the cable 32 is drawn snug with the winch 16, lifting the distal edge ever so slightly, and by leverage between the float 24 and the winch 16, pressing the stabilizing portion 14 of the boom against the top surface 40 of the new dock section 25.

Having thus engaged the boom 1 with the new dock section 25, the installer may manually lift the proximal edge 38 of said new dock section 25, thereby, in cooperation with the leverage provided by the boom 1 and the float 24, lifting the entire new dock section 25. The installer then walks to the place at which the proximal edge 38 of the new dock section 25 is to be anchored and lowers the new dock section 25, anchoring the proximal edge 38 thereof.

Figure 3:
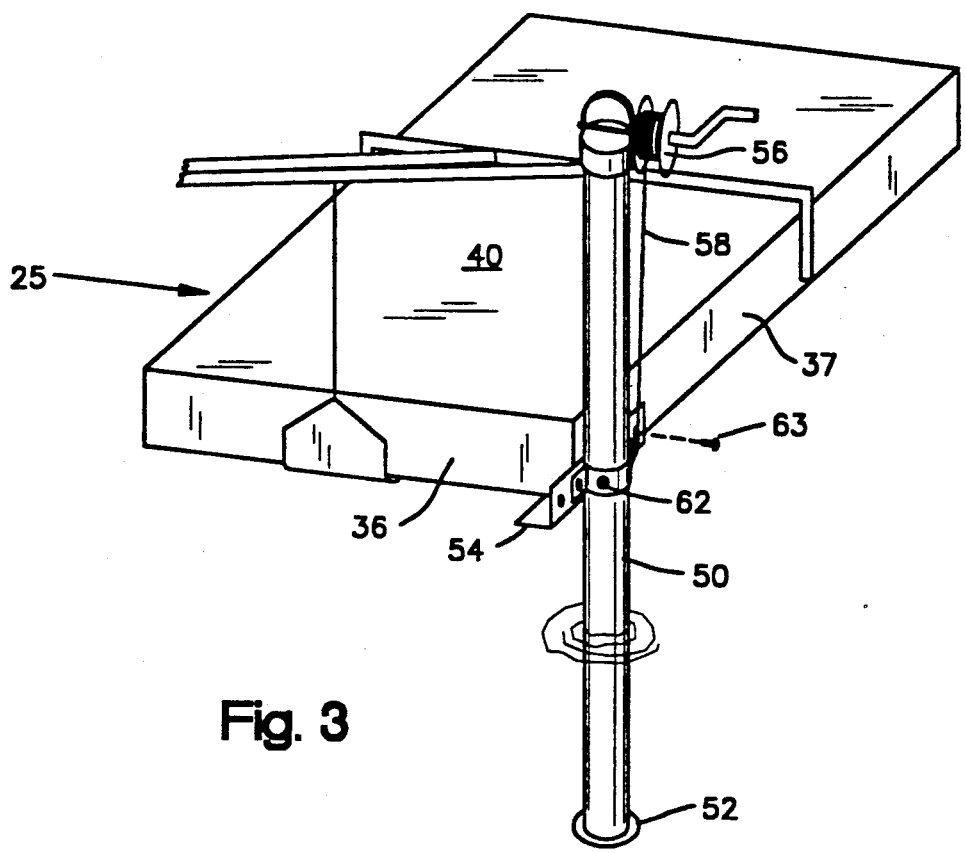
FIG. 3 shows, in perspective view, additional lifting and anchoring apparatus employed in the method of the present invention.

Attention is now drawn to FIG. 3. With the proximal edge 38 anchored, the installer may walk upon the new dock section 25, still supported by the boom 1; he may adjust the lifting winch 16 to elevate the dock section properly.

Uprights 50 that engage the bottom 52 of the body of water and support by means of adjustable platform supports 54 the dock above the water are then installed. In practice, the uprights 50 are assembled on-shore with the platform supports 54 positioned in approximate locations and with a leveling cable winch 56 removably installed at the top of each upright 50 and removably connected by suitable cable 58 to each respective platform support 54.

To position each upright 50, the installer walks upon the new dock section 25 supported by the boom 1 and anchored to the shore and places the upright 50 in the water adjacent the new dock section 25. One upright is placed at each end of the distal edge 36 of the new dock section. By one means or another (several approaches will be obvious to the installer) the installer then lowers the platform support 54 into alignment with the end of the distal edge 36 of the new dock section 25, then engages the support 54 with the adjacent lateral edge 37 and lifts the support by using the leveling winch 56. When the new dock section 25 is thereby supported on the two new uprights 50, the boom 1 may be disengaged from the new dock section and moved away. The new dock section 25 may be adjusted and leveled and setscrews 62 affixing the platform support 54 to the upright 50 may be tightened and screws 63 affixing the platform support 54 to the new dock section 25 installed to permit removal of the leveling winches 56. The leveling winches may be installed for re-leveling of the dock sections at other times during the boating season.

In most all instances, additional stability is required to prevent failure of the dock to withstand even slight lateral loads. In some prior art docks, the upright supports are driven into the bottom of the body of water, thereby gaining lateral stability from the earth surrounding the upright. The uprights of the dock herein described need not be driven into the earth. A novel diagonal support has been devised to provide the needed lateral bracing and to provide for installing thereof in keeping with the object of this invention, i.e., without the installer entering the water.

Figure 4:
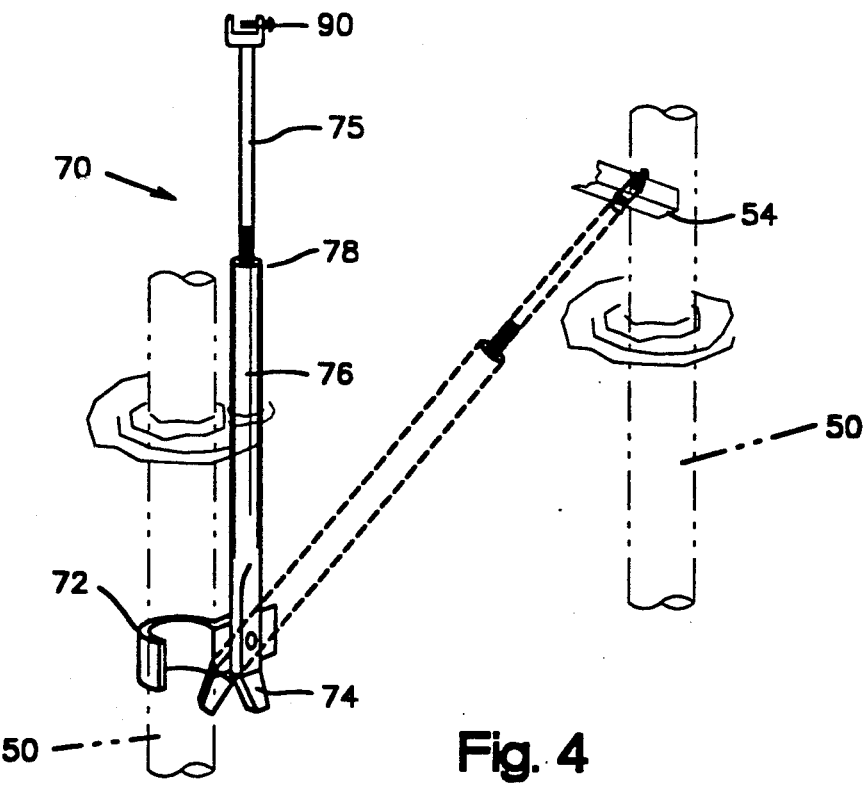
FIG. 4 shows, in perspective view, additional diagonal support apparatus employed in the method of the present invention.

The preferred embodiment of the diagonal support 70 is shown in FIG. 4. The support 70 comprises a curved plate portion 72 that slidably engages and partially surrounds the dock upright 50; pivotably attached to this curved plate 72 is a locking element 74 to which is attached what we shall call a stringer 78, comprising an internally threaded tube 76 engaged by a threaded rod 75 to which is attached at the distal end thereof a screw clamp 90. With the stringer 78 approximately parallel to the upright 50, the curved plate portion 72 may be engaged upon the upright 50 and may be slidably positioned on the same, potentially at an underwater location. This is done with the installer lying upon the new dock section 25 in a prone position, working from above the water. Once this end of the support is at the proper vertical position along the upright 50, the stringer 78 is moved from the parallel position to a diagonal position whereby its screw clamp 90 may at least nearly engage the dock support 54 on a neighboring upright 50. In this position, the locking element 74 has been pivoted to provide pressure against the upright, clamping the upright between the curved plate 72 and the locking element 74 to prevent relative sliding motion of the diagonal support 70 on the upright 50. The threaded rod and tube device may be used to adjust the length of the stringer 78 to permit the proper engagement of the screw clamp 90 with the appropriate dock support 54. In practice, two crossing diagonal supports should be used because the elongated stringer provides significant strength in tension only.

The installing method thus described applies to installing the first dock section only, that dock section being anchored on the shore. Once the first section is installed, it may be used in a manner similar to that described as the shoreline. Anchoring the proximal edge of each new dock section in this case means lowering it into engagement with the previously installed dock support and attaching it with screws. Thus a long dock may be assembled from a plurality of individual dock sections, each of which is installed without the installer entering the water.

It is obvious that the installing process may be reversed to remove a dock at the end of the boating season. Thus, it is reasonable to expect that the boom would best be capable of being disassembled for convenient transport or storage. It is well within the available prior art to provide numerous different means to accomplish such construction.

While I have shown and described only one principal embodiment in accordance with the present invention, including only a few possible variations, it is understood that the invention is not limited thereto, but is susceptible to numerous changes and modifications as known to those skilled in the art. Therefore, I do not wish to be limited to the details shown and described herein, but intend to cover all such changes and modifications as are encompassed by the scope of the claims appended hereto.

I claim:

1. Apparatus for installing a dock wherein said dock comprises:
   a. a plurality of upright posts to engage the earth below the water level of a body of water and having a length extending above said water level;
   b. a plurality of dock sections, each having a frame portion and a deck portion; and
   c. paired dock frame support means for releasably engaging opposing edges of a said frame portion of one or more dock sections with similarly paired said upright posts, each respective said means being adjustable along the length of a respective said upright post;

said apparatus being a boom comprising:
   a. an elongated reach portion having a proximal end, and a distal end;
   b. a descending leg portion having a first end adapted to attach to a float upon said body of water and a second end fixedly attached to said distal end of said reach forming an angle therewith to define a plane that substantially includes said reach and said descending leg portion;
   c. a stabilizing portion fixedly attached to said proximal end of said reach and substantially normal thereto and substantially normal to said plane; and
   d. a lifting means medially located on said reach.

2. The apparatus of claim 1 wherein said lifting means is adapted to engage a distal edge of said frame portion while said stabilizing portion rests upon said deck portion of said dock section and while said descending leg engages said float upon said body of water, thereby to allow an installer to lift said dock section by means of leverage acting through said boom and through said deck section by said installer manually raising a proximal edge of said frame portion of said dock section.

3. The apparatus of claim 1 wherein said lifting means is a cable winch.

4. The apparatus of claim 1 wherein said reach comprises two spaced apart and substantially parallel elements having said lifting means mounted therebetween.

5. The apparatus of claim 1 wherein said stabilizing portion is adapted to releasably attach to said dock section.

6. The apparatus of claim 1 wherein said stabilizing portion is adapted to non-slidably engage said dock section.

7. A dock comprising:
   a. a plurality of upright posts to engage the earth below the water level of a body of water and having a length extending above said water level;
   b. a plurality of dock sections, each having a frame portion and a deck portion; and
   c. paired dock frame support means for releasably engaging opposing edges of a said frame portion of one or more dock sections with similarly paired said upright posts, each respective said means being adjustable along the length of a respective said upright post;

and wherein said dock is distinguished from other similar docks in that it further comprises a diagonal brace interconnecting at a proximal end thereof a submerged portion of a first said upright post with, at a distal end thereof, a dock frame support means associated with an adjacent second said upright post wherein a submerged connecting means that connects said diagonal brace to said first post is of a clamping type that is operable by an installer manipulating a clamping element thereof by means of said diagonal brace from said distal end thereof, and thereby said diagonal brace is adapted to be alternatively installed and removed without said installer entering the water.

8. The dock of claim 7 wherein said submerged connecting means comprises a curved plate that partially encloses said first post and a substantially flat plate pivotably connected to said curved plate to pivot about an axis that is substantially tangent to the periphery of said curved plate at a straight edge thereof, said flat plate thus being selectively positioned to be substantially parallel to said straight edge in an unlocked position or at an angle to said straight edge, thereby to partially complete the enclosing of said first post and thereby to clamp said connecting means thereto.

9. The dock of claim 7 wherein said submerged connecting means comprises a curved plate that partially encloses said first post and a cam pivotably connected to said curved plate about an axis that is substantially tangent to the periphery of said curved plate, said cam being selectively positioned to apply pressure to said first post and thereby to clamp said connecting means thereto or to disengage from said first post to allow movement of said connecting means thereon.

10. A method of installing a small boat dock whereby at no time is the installer required to enter the water, wherein said dock comprises:
   a. a plurality of upright posts to engage the earth below the water level of a body of water and having a length extending above said water level;
   b. a plurality of dock sections, each having a frame portion and a deck portion;
   c. paired dock frame support means for releasably engaging opposing edges of a said frame portion of one or more dock sections with similarly paired said upright posts, each respective said means being adjustable along the length of a respective said upright post; and
   d. diagonal braces interconnecting a submerged portion of a first said upright post with a said dock frame support means associated with an adjacent second said upright post;
wherein said method comprises the step of manually lifting said dock section with the aid of an apparatus that is a boom comprising:
   a. an elongated reach portion having a proximal end, and a distal end;
   b. a descending leg portion having a first end adapted to attach to a float upon said body of water and a second end fixedly attached to said distal end of said reach forming an angle therewith to define a plane that substantially includes said reach and said descending leg portion;
   c. a stabilizing portion fixedly attached to said proximal end of said reach and substantially normal thereto and substantially normal to said plane; and
   d. a lifting means medially located on said reach.

11. The method according to claim 10 wherein the steps include:
   a. attaching said boom to said float, and putting said float offshore;
   b. laying a first said dock section to be installed flat on the shore;
   c. resting the stabilizing portion of said boom on said deck portion of said first dock section in a transverse position medial to and substantially parallel to a distal edge and a proximal edge of said first dock section;
   d. attaching said lifting means to said distal edge of said first dock section and, by leverage acting between said float and said lifting means, pressing said stabilizing portion against said deck portion;
   e. manually lifting said proximal edge of said first dock section and thereby, by leverage provided by the boom and the float, lifting said first dock section for positioning the same;
   f. manually lowering said proximal edge of said first dock section and anchoring it;
   g. while walking upon said first dock section, installing a pair of upright posts, being a first post and a second post, one at each end of said distal edge of said first dock section;
   h. while walking upon said first dock section, adjusting the elevation of said first dock section;
   i. while lying upon said first dock section, attaching said paired dock support means to said upright posts and said dock section, there being a first support means on said first post and a second support means on said second post;
   j. while lying upon said first dock section, installing a pair said diagonal braces to interconnect said first post to said second support means and said second post to said first support means.

12. A dock comprising:
   a. a plurality of upright posts to engage the earth below the water level of a body of water and having a length extending above said water level;
   b. a plurality of dock sections, each having a frame portion and a deck portion; and
   c. paired dock frame support means for releasably engaging opposing edges of a said frame portion of one or more dock sections with similarly paired said upright posts, each respective said means being adjustable along the length of a respective said upright post;
and wherein said dock is distinguished from other similar docks in that it further comprises a diagonal brace that is threadably adjustable in length interconnecting at a proximal end thereof a submerged portion of a first said upright post with, at a distal end thereof, a dock frame support means associated with an adjacent second said upright post wherein a submerged clamping element that connects said diagonal brace to said first post is of a type that is operable by an installer manipulating a clamping element thereof by means of said diagonal brace from said distal end thereof, and thereby said diagonal brace is adapted to be alternatively installed and removed without said installer entering the water.

13. The dock of claim 12 wherein said submerged clamping means comprises a curved plate that partially encloses said first post and a substantially flat plate pivotably connected to said curved plate to pivot about an axis that is substantially tangent to the periphery said curved plate at a straight edge thereof, said flat plate thus being selectively positioned to be substantially parallel to said straight edge in an unlocked position or at an angle to said straight edge, thereby to partially complete the enclosing of said first post and thereby to clamp said clamping means thereto.

14. The dock of claim 12 wherein said submerged clamping means comprises a curved plate that partially encloses said first post and a cam pivotably connected to said curved plate about an axis that is substantially tangent to the periphery of said curve plate, said cam being selectively positioned to apply pressure to said first post and thereby to clamp said clamping means thereto or to disengage from said first post to allow movement of said clamping means thereon.

* * * * *